D. E. Hayward,

Shoe Uppers,

No. 2,770. Reissued Oct. 8, 1867.

Witnesses:

Sam. Cooper

P. E. Schepmacher

Inventor:

D. E. Hayward.

N. PETERS, PHOTO-LITHOGRAPHER, WASHINGTON, D. C.

UNITED STATES PATENT OFFICE.

JOHN ASHTON GREENE, OF BROOKLYN, NEW YORK, ASSIGNEE, BY MESNE ASSIGNMENTS, OF DANIEL E. HAYWARD, ASSIGNOR TO ALFRED B. ELY AND CHARLES WILD, TRUSTEES.

IMPROVEMENT IN HEEL-STIFFENERS.

Specification forming part of Letters Patent No. 40,409, dated October 27, 1863; reissue No. 2,770, dated October 8, 1867.

DIVISION A.

*To all whom it may concern:*

Be it known that DANIEL EDWIN HAYWARD, of Melrose, in the county of Middlesex and State of Massachusetts, has invented an Improved Heel-Stiffener or Counter for Boots and Shoes, of which the following is a full, clear, and exact description, reference being had to the accompanying drawings making part of this specification, in which—

Figure 2:
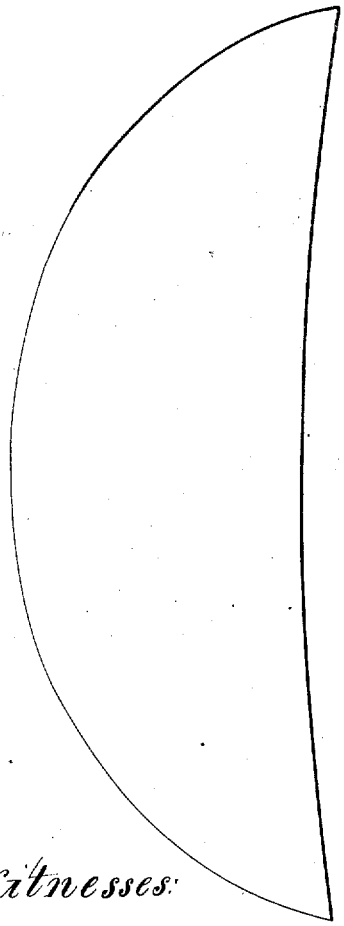
Figure 1:
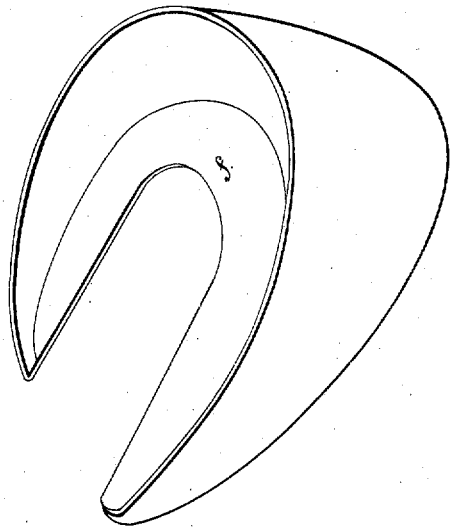

Figure 1 is a perspective view of the improved heel-stiffener. Fig. 2 is an elevation of the piece of sheet-rubber of which it is made.

Heel-stiffeners or counters have heretofore been made of leather; but this material is costly, and the labor required to cut them out and skive them is considerable. The chief objection, however, to which they are liable arises from the time and labor required to apply them to the boot. After being cut out and skived they are temporarily secured to the last and lining, and then bent round and crimped over upon the inner sole and secured there. This must be done while the stiffener is wet and pliable. The leather stiffener is also liable to the objection that it will lose its resiliency if bent out of shape when wet, and will not return to its original form, and thus the boot wears over to one side.

The cheap substitutes for leather which have been employed for stiffeners, such as pasteboards and factitious leather, are valueless. Heel-stiffeners have been made of sheet-rubber, which has been cut, crimped, folded, and cemented over the shoe while in course of construction. This is expensive, and no claim is therefore laid to any such stiffeners.

In the manufacture of the improved stiffener, any suitable compound of india-rubber is employed which, when vulcanized, will have the required stiffness combined with the necessary resiliency. This compound, after being ground upon the ordinary heated rolls, is spread in a sheet of from one-eighth to one-tenth of an inch in thickness upon cotton or other cloth, the thickness of the sheet and of the cloth varying with the size of the required stiffener. Pieces, Fig. 2, are then cut from the sheet of cloth and rubber of the required size, which are placed in a mold and vulcanized, the cloth being thrown upon the inside of the stiffener, and the mold being of a form that shall give it the required shape, Fig. 1, the part *f*, which goes beneath the heel, being of the exact form ultimately required, so that when applied to the boot or shoe it is simply necessary to put it in place, no wetting, crimping, bending, or temporary nailing being required. When the upper-leather and sole are applied, the stitches, nails, or pegs that hold them together also pass through the part *f* of the stiffener, in the ordinary manner.

This stiffener also is permanently resilient, even when wet, and does not lose its form or shape, however long or severe the wear to which it is exposed.

This stiffener may be placed outside the leather, if preferred.

The proportions which are preferred are as follows: Eight pounds crude rubber, two pounds litharge, one pound white lead, one pound lamp-black, four pounds calcined plaster, and six ounces flowers of sulphur. This compound, after being thoroughly ground upon the ordinary heated rolls and placed in the molds, is vulcanized by exposure for ten hours, or thereabout, to a temperature of 275° Fahrenheit.

The stiffener may be made less elastic and cheaper by mixing with the above rubber compound some fibrous material, such as cotton or linen rags, in the proportion of about two of the latter to one of the former in weight.

I do not, however, wish to confine myself to any particular compound, nor to any particular length of time for vulcanizing the same.

What is claimed herein as the invention of the said HAYWARD, as a new article of manufacture for the heels of boots and shoes, is—

A stiffening made of india-rubber mixed with ground rags or other suitable fibrous material and formed in molds, substantially as and for the purpose described.

In testimony whereof I have hereunto affixed my name before the two subscribing witnesses.

JOHN ASHTON GREENE.

Witnesses:

WM. R. BENNETT,

HENRY A. TWEED.